(12) United States Patent
Lee

(10) Patent No.: US 7,095,468 B2
(45) Date of Patent: Aug. 22, 2006

(54) APPARATUS, MASK, AND METHOD FOR PRINTING ALIGNMENT LAYER

(75) Inventor: Dae Hoon Lee, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/311,292

(22) Filed: Dec. 20, 2005

(65) Prior Publication Data

US 2006/0092359 A1    May 4, 2006

Related U.S. Application Data

(62) Division of application No. 10/271,743, filed on Oct. 17, 2002, now Pat. No. 6,999,148.

(30) Foreign Application Priority Data

Oct. 25, 2001   (KR) .............................. P2001-66045

(51) Int. Cl.
*G02F 1/1337* (2006.01)
*G02F 1/13* (2006.01)

(52) U.S. Cl. ..................... 349/124; 349/123; 349/187

(58) Field of Classification Search ........ 349/123–126, 349/187, 191
See application file for complete search history.

(56) References Cited

U.S. PATENT DOCUMENTS

| 5,419,991 | A | 5/1995 | Segawa ................... 430/20 |
| 5,446,569 | A | 8/1995 | Iwai et al. ................ 349/124 |
| 6,249,331 | B1 | 6/2001 | Choi ........................ 349/124 |
| 6,323,925 | B1 * | 11/2001 | Choi ........................ 349/124 |

FOREIGN PATENT DOCUMENTS

| JP | 07-270795 | 10/1995 |
| JP | 09-090307 | 4/1997 |
| KR | 1992-003350 | 4/1992 |

* cited by examiner

*Primary Examiner*—Tarifur R. Chowdhury
(74) *Attorney, Agent, or Firm*—Morgan, Lewis & Bockius, LLP

(57) ABSTRACT

An apparatus for printing an alignment layer of a liquid crystal display device includes a dispenser dropping an alignment material, an anilox roll receiving the dropped alignment material, a doctor roll evenly spreading the dropped alignment material coated onto the anilox roll, and a printing roll receiving the alignment material from the anilox roll, and transferring the alignment material onto a substrate, wherein the printing roll has a plurality of masks each having a numerical aperture of about 5% to 25%.

6 Claims, 4 Drawing Sheets direction of printing direction of printing

APPARATUS, MASK, AND METHOD FOR PRINTING ALIGNMENT LAYER

This application is a Divisional of U.S. patent application Ser. No. 10/271,743 filed Oct. 17, 2002 now U.S. Pat. No. 6,999,148 and claims the benefit of the Korean Application No. P2001-66045 filed on Oct. 25, 2001, both of which are hereby incorporated by reference in their entirety.

BACKGROUND OF THE INVENTION

1. Field of the Invention

The present invention relates to a liquid crystal display device, and more particularly, to a device and method for printing an alignment layer and a mask for printing an alignment layer.

2. Background of the Related Art

In general, different types of flat panel displays are commonly implemented in various display apparatus, including Liquid Crystal Display (LCD), Plasma Display Panel (PDP), Electro Luminescent Display (ELD), and Vacuum Fluorescent Display (VFD). Of these different types, the LCD devices have commonly replaced apparatus that used Cathode Ray Tubes (CRTs) because of their excellent picture quality, light weight, thin profile, and low power consumption. In addition to mobile apparatus that use LCDs, such as monitors of notebook computers, the LCDs are increasingly being implemented for televisions and for monitors of home computers.

In general, an LCD device includes a liquid crystal display panel for displaying a picture, and a driving part for providing a driving signal to the liquid crystal display panel. The liquid crystal display panel includes first and second substrates bonded together with a gap formed between the first and second substrates, and a liquid crystal material is injected into the gap between the first and second glass substrates.

On the first substrate (commonly referred to as a TFT array substrate), there are a plurality of gate lines arranged along one direction at fixed intervals, a plurality of data lines arranged along a second direction perpendicular to the gate lines at fixed intervals, a plurality of pixel electrodes disposed within pixel regions defined by an intersection of the gate and data lines that form a matrix, and a plurality of thin film transistors switchable in response to a signal transmitted by the gate lines for conducting a signal from the data line to the pixel electrodes. On the second substrate (commonly referred to as a color filter substrate), there is a black matrix layer for shielding light from portions other than the pixel regions, a red (R), green (G), and blue (B) color filter layer for displaying colors, and a common electrode for implementing a picture.

The first and second substrates are spaced apart by spacers, and bonded together by a sealant material. The sealant material includes a liquid crystal material injection hole, through which the liquid crystal material is injected. Physical characteristics of the liquid crystal material are dependent on molecular arrangement of the liquid crystal molecules, and may be altered by application of an external force, such as electric field. Accordingly, filling of the liquid crystal material between the first and the second substrates cannot provide uniform molecular arrangement required for proper operation of the LCD device. Thus, an alignment layer is formed upon a surface of each of the first and second substrates.

In general, main composition materials for forming the alignment layers commonly include inorganic or organic substances. Of these main composition materials, polyimide group materials are generally considered better as compared to other organic polymers with respect to printing, rubbing, alignment control performance, and chemical stability. Currently, the polyimide group materials are commonly employed as a material for forming alignment layers of various LCD devices.

During formation of the alignment layers, diamine and acid anhydride are made to react in a solvent to prepare formation of polyamic acid. The material used during printing is the polyamic acid, whereby the polyimide is obtained as the polyamic acid is dried and set by application of heating. The polyimide alignment layer may be formed by various processes including spinning, spraying, dipping, and printing.

FIG. 1 is a schematic view of a device for printing an alignment layer according to the related art. In FIG. 1, the device includes a raw material tank 103 having raw material 101, a raw material supply tube 104, a dispenser 100, an anilox roll 120, a doctor roll 110, and a printing roll 130.

A mask 210 is positioned on the printing roll 130, and is formed of a printing rubber plate with a 30% numerical aperture. The numerical aperture is defined as a ratio of a portion of mask that does not have the raw material 101 to a portion of the mask that has the raw material 101. Generally, a mask 210 with a numerical aperture below 30% is employed for an LCD device having a resolution class below a high resolution XGA (1024×768 class).

In order to flow the raw material 101 through the raw material supply tube 104, nitrogen gas ($N_2$) is injected into the raw material tank 103. When the nitrogen gas ($N_2$) is supplied to the raw material tank 103, the raw material 101 is dropped from the dispenser onto the rotating doctor roll 110 and the anilox roll 120 via the raw material supply tube 104. The raw material 101 supplied to the doctor roll 110 and the anilox roll 120 is kneaded between the doctor roll 110 and the anilox roll 120, whereby the raw material 101 is evenly coated onto the surface of the anilox roll 120. Then, the evenly coated raw material 101 on the anilox roll 120 is transferred onto the substrate 150 that is positioned on the printing table 160 by the printing roll 130. Accordingly, the masks 210 positioned on the printing roll 130 each have a 30% numerical aperture such that the substrate includes portions having the raw material 101 and portions not having the raw material 101. Finally, the raw material 101 positioned on the substrate 150 is cured, thereby forming the alignment layer.

FIGS. 2A–2C are plan and perspective views of a mask for printing an alignment layer according to the related art. In FIG. 2A, a matrix of masks 210 having a plurality of projections 220 are positioned on a substrate 200, wherein each of the masks 210 is formed of printing rubber plate.

In FIG. 2B, during transfer of the raw material 101 from the printing roll 130 onto the substrate 150 (in FIG. 1), no raw material 101 is transferred from regions having the projections 220. Accordingly, the raw material 101 cannot be transferred to the substrate 150 (in FIG. 1) where the projections 220 contact the substrate 150. If a mask 210 without the projections 220 is used, the raw material 101 cannot be uniformly coated onto the surface of the mask 210 uniformly, thereby forming blots of raw material onto the substrate 150 (in FIG. 1). Thus, a plurality of openings 220 are formed in the surface of the mask 210 for uniform transfer of the raw material 101 onto the substrate 150 (in FIG. 1). In addition, defective printing of the raw material 101 onto the substrate 150 is proportional to an area of the substrate 150 having no raw material 101 printed thereon.

Moreover, LCD devices classified below the high resolution class that have large sized pixels also have a lower ratio of defect occurrence caused by infiltration of contaminants than LCD devices classified above the high resolution class even using the mask 210 having a 30% numerical aperture.

In FIG. 2C, the raw material 101 is transferred onto the substrate 150 (in FIG. 1) except where regions correspond to the projections 220 on the mask 210. Accordingly, the 30% numerical aperture mask 210 is problematic when implemented for fabricating LCD devices classified in the high resolution class or higher having small unit pixels. Since the 30% numerical aperture mask 210 includes the projections 220, contaminates, such as dirt, are transferred onto the printing roll and onto the substrate.

SUMMARY OF THE INVENTION

Accordingly, the present invention is directed to an apparatus, method, and mask for printing an alignment layer that substantially obviates one or more of the problems due to limitations and disadvantages of the related art.

An object of the present invention is to provide an apparatus, mask, and method for printing an alignment layer that is applicable to LCD devices in the high resolution XGA (1024×768) class.

Another object of the present invention is to provide an apparatus, mask, and method for printing an alignment layer that can reduce influence of contamination of the projections from a printing roll and onto a substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus printing an alignment layer of a liquid crystal display device includes a dispenser dropping an alignment material, an anilox roll receiving the dropped alignment material, a doctor roll evenly spreading the dropped alignment material coated onto the anilox roll, and a printing roll receiving the alignment material from the anilox roll, and transferring the alignment material onto a substrate, wherein the printing roll has a plurality of masks each having a numerical aperture of about 5% to 25%.

In another aspect, a method for printing an alignment layer of a liquid crystal display device includes preparing an alignment material, dropping the alignment material onto a doctor roll and an anilox roll by a dispenser, printing the alignment material onto a substrate by using a printing roll having at least one mask with a numerical aperture of about 5% to about 25%, and curing the alignment material printed on the substrate.

In another aspect, a mask for printing an alignment layer of a liquid crystal display device includes a plurality of protrusions, wherein a numerical aperture of the mask is about 5% to about 25%.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
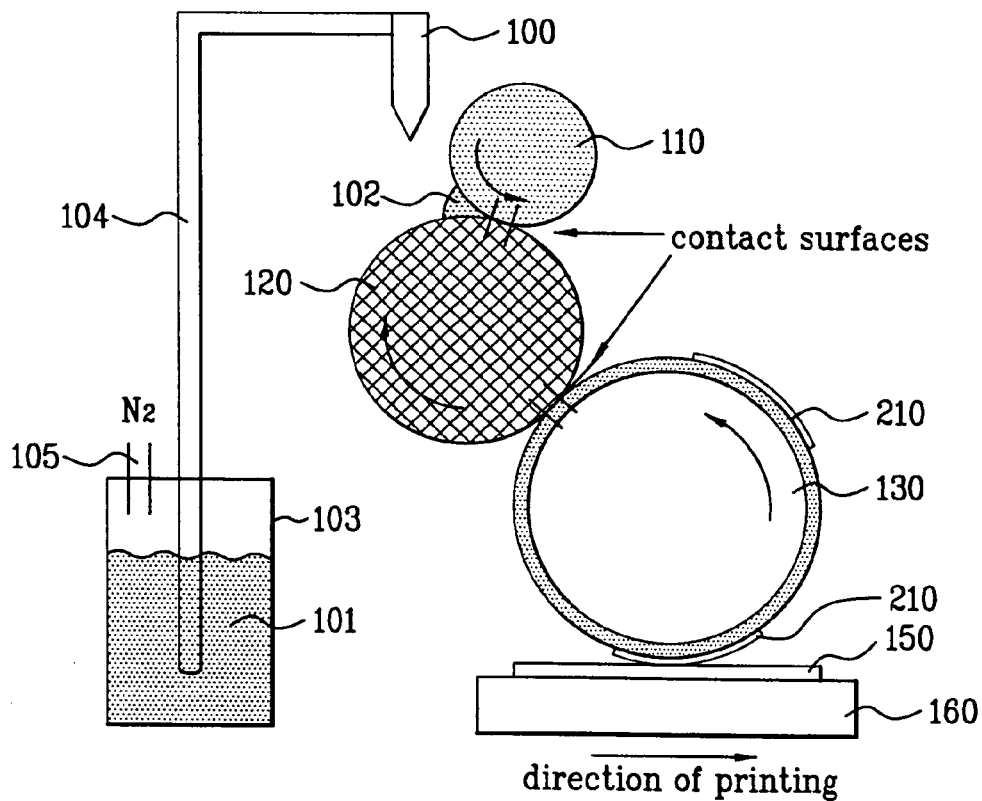
FIG. 1 is a schematic view of a device for printing an alignment layer according to the related art.
Figure 2A:
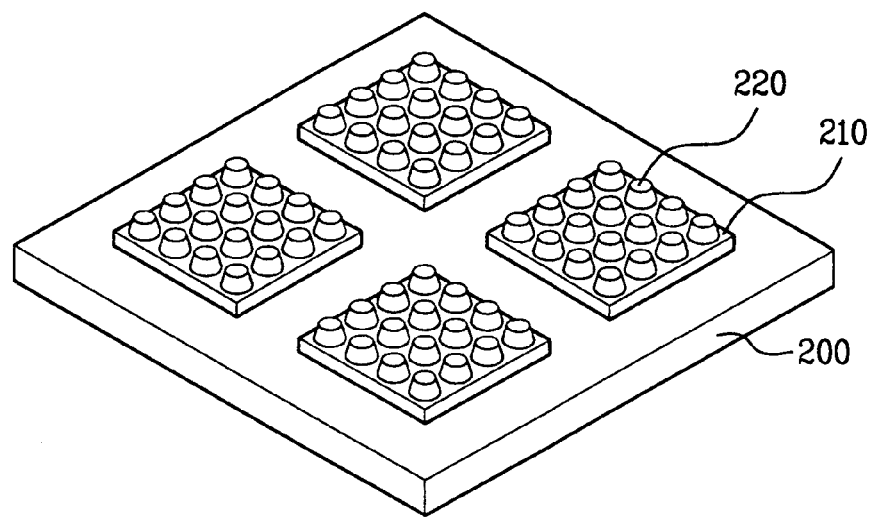
FIGS. 2A–2C are plan and perspective views of a mask for printing an alignment layer according to the related art.
Figure 2B:
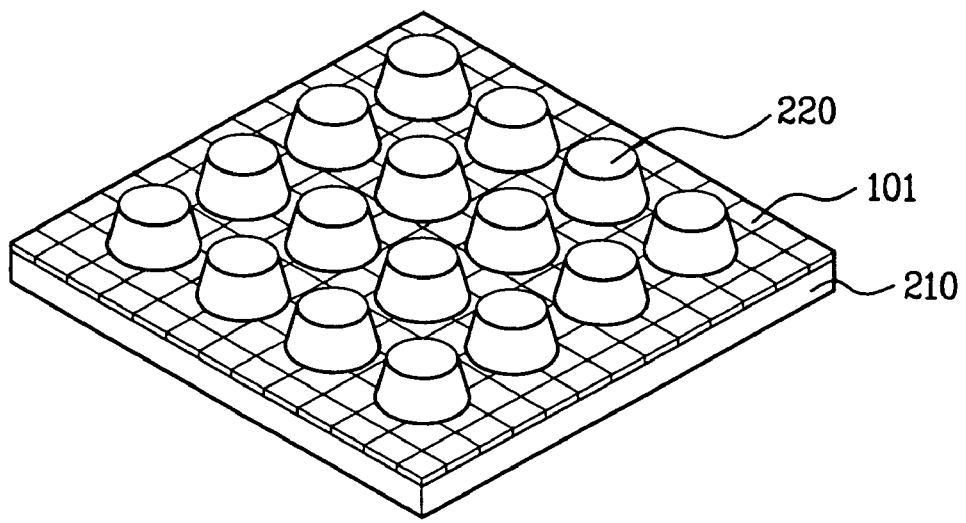
Figure 2C:
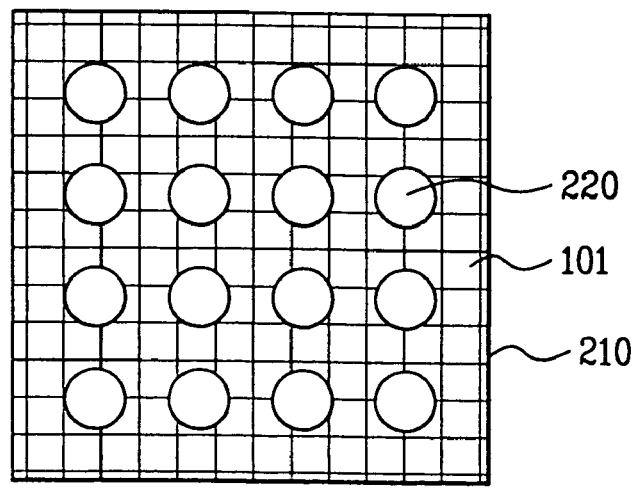
Figure 3:
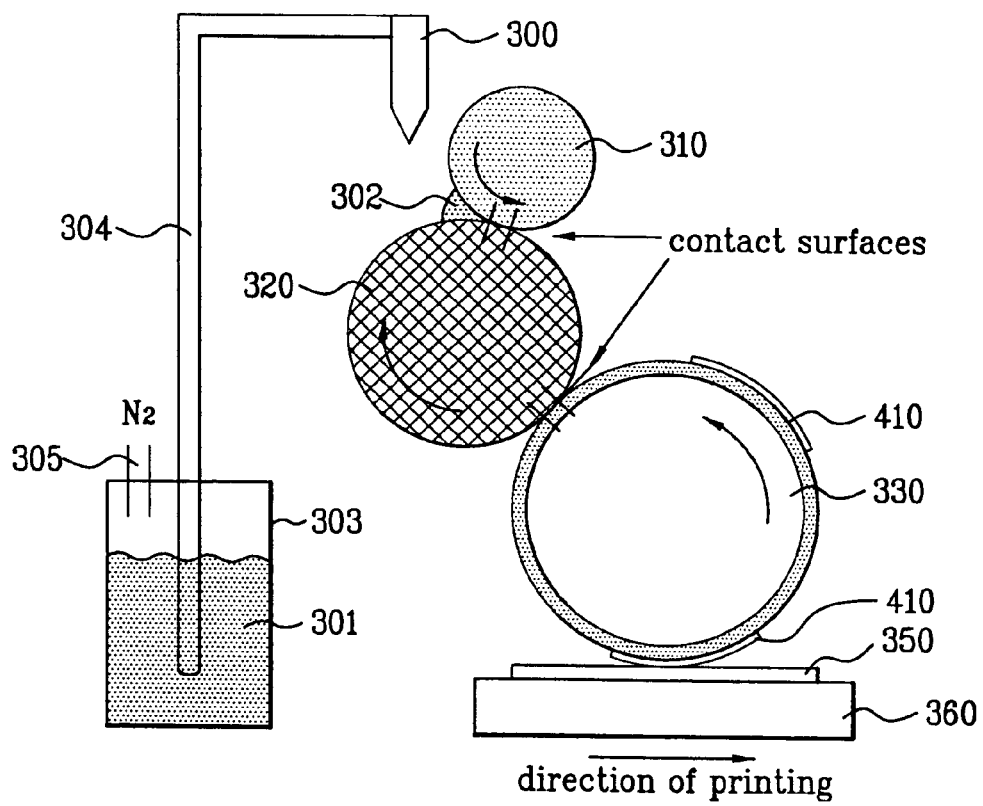
FIG. 3 is a schematic view of an exemplary device for printing an alignment layer according to the present invention.

FIG. 3 is a schematic view of an exemplary device for printing an alignment layer according to the present invention. In FIG. 3, the device may include a raw material tank 303 having a raw material 301 for forming the alignment layer stored therein, a raw material supply tube 304 for supplying the raw material 301 in the raw material tank 303, a dispenser 300 for dropping the raw material 301 supplied by the raw material supply tube 304, an anilox roll 320 for receiving the raw material 301 dropped from the dispenser 300 onto a surface thereof (shown as 302), a doctor roll 310 rotatably fitted and spaced apart from the anilox roll 320 for even spreading of the raw material 301 onto the anilox roll 320, and a printing roll 330 for receiving the raw material 301 from the surface of the anilox roll 320, and printing the raw material 301 onto the substrate 350 disposed on a printing table 360. A mask 410 may be positioned on the printing roll 330.

In order to flow the raw material 301 through the raw material supply tube 304, nitrogen gas ($N_2$) may be injected into the raw material tank 303. Accordingly, the nitrogen gas ($N_2$) may be of high purity and is supplied to the raw material tank 303 from a nitrogen gas supply part (not shown) through a gas supply tube 305. When the nitrogen gas ($N_2$) is supplied to the raw material tank 303, the raw material 301 is dropped from the dispenser onto the rotating doctor roll 310 and the anilox roll 320 via the raw material supply tube 304. The raw material 301 supplied to the doctor roll 310, and the anilox roll 320 is kneaded between the doctor roll 310 and the anilox roll 320, whereby the raw material 301 is evenly coated onto the surface of the anilox roll 320. A thickness of the raw material 301 transmitted onto the substrate 350 is dependent upon the gap between the doctor roll 310 and the anilox roll 320. Then, the evenly coated raw material 301 on the anilox roll 320 is transferred onto the substrate 350 that is positioned on the printing table 360 by the printing roll 330. Then, the raw material 301 positioned on the substrate 350 may be cured at a temperature ranging from about 60° C.–80° C. for about 90 seconds as a first period of time, and at a temperature ranging from about 80° C.–250° C. for about 780 seconds as a second period of time. Finally, the cured raw material 301 may be rubbed, or irradiated with light to form the alignment layer.

Figure 4A:
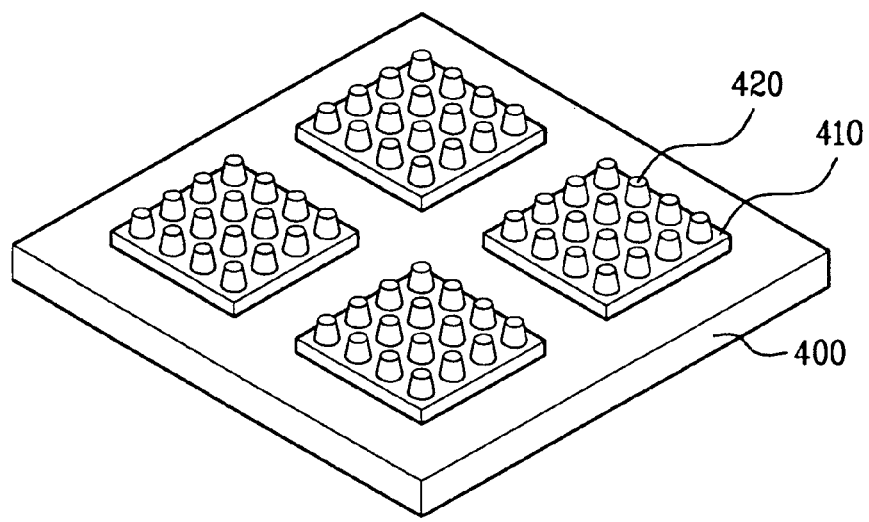
FIGS. 4A–4C are plan and perspective views of an exemplary mask for printing an alignment layer according to the present invention.
Figure 4B:
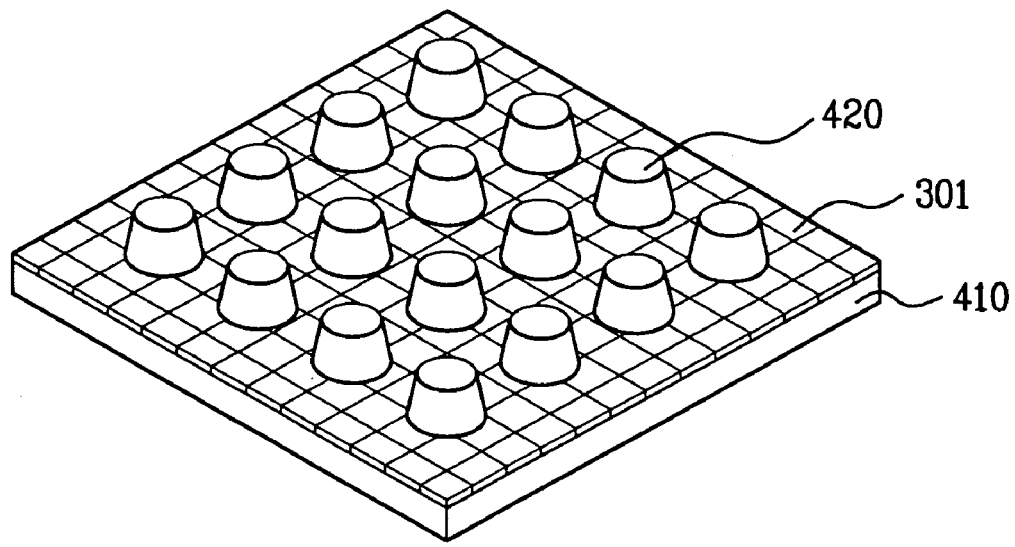
Figure 4C:
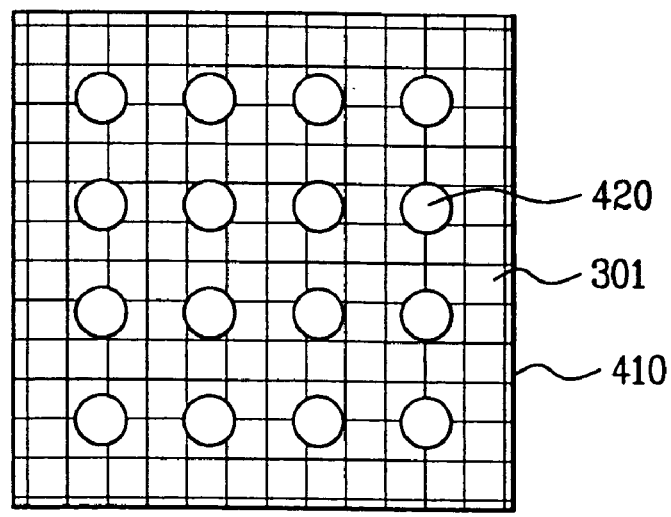

FIGS. 4A–4C are plan and perspective views of an exemplary mask for printing an alignment layer according to the present invention. In FIG. 4A, a matrix of masks 410 each having projections 420 about 0.75 mm from a surface of the mask 410 may be formed at fixed intervals on a substrate 400. The mask 410 may be formed of a printing rubber plate or an APR rubber plate, and may have a size similar to a size of the substrate 400. Alternatively, the mask 410 may have a size smaller than a size of the substrate 400, thereby accommodating a plurality of masks 410. Moreover, positioning of the plurality of masks 410 may include offset and staggered relative positions.

In FIG. 4B, a total thickness of the mask 410 may be about 2.09 mm, and the projections 420 may project from a surface of the substrate 400 by about 0.75 mm. The mask 410 may have a numerical aperture of about 5% to about 25%. Accordingly, since the projections 420 may project as much as about 0.75 mm from the surface of the mask 410, the projections 420 do not interfere with rotation of the printing roll 330. In addition, the total thickness of the mask 410 and the height of the projections 420 may be varied without changing the numerical aperture. Moreover, the numerical aperture may be changed by varying the total thickness of the mask 410 and the height of the projections 420. Alternatively, the projections 420 may include different cross sectional geometries. For example, each of the projections 420 may have a circular, oval, or square cross section. Alternatively, each of the projections 420 may have different cross sections. For example, projections 420 positioned along an outer perimeter of the mask 410 may have a first type of cross sectional geometry and projections 420 positioned within the outer perimeter of the mask 410 may have a second type of cross sectional geometry different from the first type. Accordingly, an amount of contact between the mask 420 and the substrate 350 may be varied based upon on the numerical aperture of the mask 420.

In FIG. 4C, when the raw material 301 is coated on an entire surface of the mask 410, the raw material 301 is transferred onto the substrate 410 except at regions corresponding to the projections 420 on the mask 410. Accordingly, since the mask 410 has the numerical aperture of about 5% to 25%, alignment layers of LCD devices of the high resolution class may be achieved. In addition, since the mask 410 has the numerical aperture of about 5% to about 25%, contact areas between the protrusions 420 of the mask 410 and the substrate 350 (in FIG. 3) is reduced, thereby reducing contamination of the printing roll 330 (in FIG. 3) and the substrate 350 (in FIG. 3).

It will be apparent to those skilled in the art that various modifications and variations can be made in the device and method for printing an alignment layer of the present invention without departing from the spirit or scope of the invention. Thus, it is intended that the present invention cover the modifications and variations of this invention provided they come within the scope of the appended claims and their equivalents.

What is claimed is:

1. An apparatus for printing an alignment layer of a liquid crystal display device, comprising:
   a dispenser dropping an alignment material;
   an anilox roll receiving the dropped alignment material;
   a doctor roll evenly spreading the dropped alignment material coated onto the anilox roll; and
   a printing roll receiving the alignment material from the anilox roll, and transferring the alignment material onto a substrate,
   wherein the printing roll has a plurality of masks each having a numerical aperture of about 5% to 25%.

2. The apparatus according to claim 1, wherein the masks include a plurality of projections.

3. The apparatus according to claim 2, wherein the projections project about 0.75 mm from a surface of the mask.

4. The apparatus according to claim 1, wherein the alignment material includes a polyimide material.

5. The apparatus according to claim 1, wherein the mask has a total thickness of about 2.09 mm.

6. The apparatus according to claim 1, wherein the mask is one of a printing rubber plate and a APR rubber plate.

* * * * *